(12) United States Patent
Tarrant

(10) Patent No.: US 8,974,940 B1
(45) Date of Patent: Mar. 10, 2015

(54) ELECTRODE CONFIGURED FOR TURBULENCE

(71) Applicant: Zinc Air Incorporated, Columbia Falls, MT (US)

(72) Inventor: Derek C. Tarrant, Kalispell, MT (US)

(73) Assignee: Vizn Energy Systems, Inc., Columbia Falls, MT (US)

( * ) Notice: Subject to any disclaimer, the term of this patent is extended or adjusted under 35 U.S.C. 154(b) by 257 days.

(21) Appl. No.: 13/724,195

(22) Filed: Dec. 21, 2012

(51) Int. Cl.
*H01M 8/18* (2006.01)
*H01M 8/20* (2006.01)
*H01M 4/86* (2006.01)

(52) U.S. Cl.
CPC ............ *H01M 4/8626* (2013.01); *H01M 8/188* (2013.01); *H01M 8/20* (2013.01)
USPC .......................................... 429/105; 429/101

(58) Field of Classification Search
CPC ....... H01M 4/021; H01M 4/025; H01M 8/18; H01M 8/182; H01M 8/184; H01M 8/186; H01M 8/188; H01M 8/20
USPC .................................................. 429/101–109
See application file for complete search history.

(56) References Cited

U.S. PATENT DOCUMENTS

| | | | |
|---|---|---|---|
| 5,542,958 A | 8/1996 | Furukawa | |
| 6,063,525 A | 5/2000 | LaFollette | |
| 2003/0143466 A1* | 7/2003 | Goda et al. | 429/241 |
| 2010/0108537 A1 | 5/2010 | Perego et al. | |
| 2011/0027621 A1 | 2/2011 | Deane et al. | |
| 2011/0244277 A1* | 10/2011 | Gordon et al. | 429/51 |
| 2012/0052347 A1 | 3/2012 | Wilson et al. | |

* cited by examiner

*Primary Examiner* — Ula C. Ruddock
*Assistant Examiner* — Scott J Chmielecki
(74) *Attorney, Agent, or Firm* — Brooks Kushman P.C.

(57) ABSTRACT

An energy storage system includes a cell having a flow chamber for receiving electrolyte, and an electrode positioned in the cell. The electrode includes a base plate having a generally planar portion and a plurality of partially cutout portions partially cut out from the generally planar portion to define a plurality of openings in the base plate. Each cutout portion is attached to the generally planar portion and has a projecting part that extends away from the generally planar portion. Furthermore, the openings and the cutout portions are configured to enhance mixing of the electrolyte when the electrolyte is received in the flow chamber.

20 Claims, 3 Drawing Sheets

US 8,974,940 B1

ELECTRODE CONFIGURED FOR TURBULENCE

TECHNICAL FIELD

The disclosure relates to an electrode for an energy storage system including one or more cells.

BACKGROUND

An energy storage system, such as a flow battery, may include one or more cells that operate to store energy provided from a source, and to discharge energy to a device to do work. Each cell may have a cathode, an anode and a separator disposed between the cathode and anode for separating chambers of the cell that receive electrolytes. The separator may permit ionic flow between the cathode and anode to facilitate energy storage in the system, as well as discharge of energy from the system.

SUMMARY

An energy storage system according to the present disclosure includes a cell having a flow chamber for receiving electrolyte, and an electrode positioned in the cell. The electrode includes a base plate having a generally planar portion and a plurality of partially cutout portions partially cut out from the generally planar portion to define a plurality of openings in the base plate. Each cutout portion is attached to the generally planar portion and has a projecting part that extends away from the generally planar portion. Furthermore, the openings and the cutout portions are configured to enhance mixing of the electrolyte when the electrolyte is received in the flow chamber.

An electrode for use with a cell of an energy storage system is also provided. The electrode includes a base plate having a generally planar portion and a plurality of partially cutout portions partially cut out from the generally planar portion to define a plurality of openings in the base plate. Each cutout portion is attached to the generally planar portion and has a projecting part that extends away from the generally planar portion. Furthermore, the openings and the cutout portions are configured to enhance mixing of electrolyte introduced into the cell.

While exemplary embodiments are illustrated and disclosed, such disclosure should not be construed to limit the claims. It is anticipated that various modifications and alternative designs may be made without departing from the scope of the invention.

DETAILED DESCRIPTION

The present disclosure describes various configurations of energy storage systems and components thereof. Several specific embodiments are set forth in the following description and in FIGS. 1-9 to provide a thorough understanding of certain embodiments according to the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Furthermore, as those of ordinary skill in the art will understand, one or more features of an embodiment illustrated and described with reference to any one of the Figures may be combined with one or more features illustrated in one or more other Figures to produce embodiments that are not explicitly illustrated or described. In addition, other embodiments may be practiced without one or more of the specific features explained in the following description.

Figure 1:
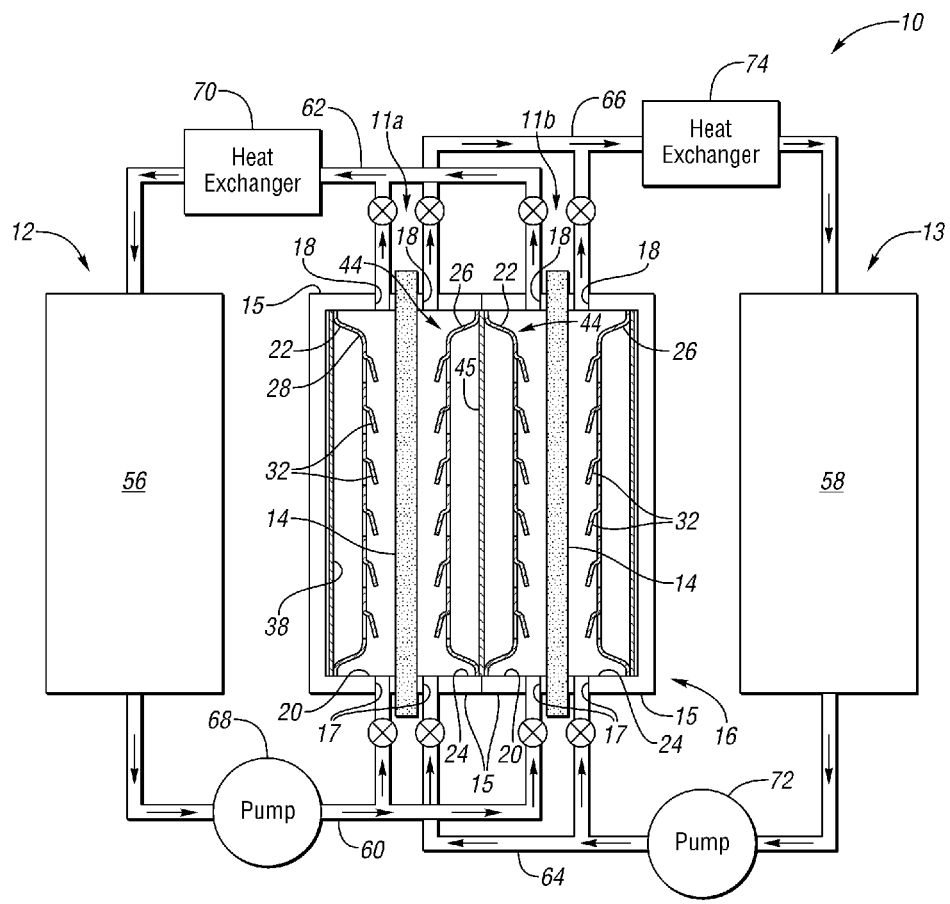
FIG. 1 is a schematic view of an energy storage system, according to the present disclosure, including first and second cells that each have first and second flow chambers, an anode adjacent the first flow chamber, a cathode adjacent the second flow chamber, and a separator between the anode and cathode, wherein each anode and each cathode includes multiple cutout portions partially cut out of a corresponding base plate.

FIG. 1 shows an energy storage system 10 according to the present disclosure. In the illustrated embodiment, the system 10 is configured as an electrochemical flow battery that is operable to store energy received from a source, and to discharge energy to one or more devices to do work. For example, the system 10 may be used in electrical utility applications for load leveling, power transmission deferral, wind power integration, and/or solar power integration.

The system 10 shown in FIG. 1 includes first and second flows cells 11a and 11b, respectively, that are joined together in a cell stack, and first and second electrolyte supply arrangements 12 and 13, respectively, for supplying electrolytes to the cells 11a and 11b such that the system 10 forms an electrochemical reactor, as explained below in greater detail. Although the system 10 is shown with two flow cells 11a and 11b, the system 10 may be provided with a single flow cell or any suitable number of flow cells that are joined together in a cell stack and that each have the same or similar configuration as described below in detail with respect to the cells 11a and 11b. Examples of cell stacks are disclosed in U.S. patent application Ser. No. 13/196,498, which is hereby incorporated in its entirety by reference.

In the embodiment shown in FIG. 1, each cell 11a, 11b includes first and second cell sides, such as an anode side and a cathode side, which are separated by a separator 14 (e.g., an ion exchange membrane). Each cell side includes a body portion or housing part 15, and the housing parts 15 are connected together to form a sealed body or housing 16. Furthermore, each housing part 15 includes one or more inlets 17 and one or more outlets 18 in fluid communication with a respective electrolyte supply arrangement 12, 13.

Each anode side further includes a first flow field or flow chamber 20 that receives a first electrolyte, such as an anolyte, from the first electrolyte supply arrangement 12, and a first electrode, such as an anode 22 according to the present disclosure, adjacent the chamber 20. Likewise, each cathode side includes a second flow field or flow chamber 24 that receives a second electrolyte, such as a catholyte, from the second electrolyte supply arrangement 13, and a second electrode, such as a cathode 26 according to the present disclosure, adjacent the chamber 24. The anodes 22 and cathodes 26 have a novel configuration for facilitating mixing of the electrolytes, as explained below in detail.

Figure 2:
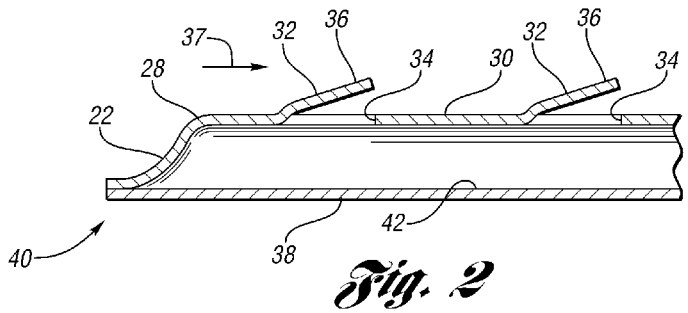
FIG. 2 is an enlarged fragmentary cross-sectional view of the anode of the first cell shown in FIG. 1.
Figure 3:
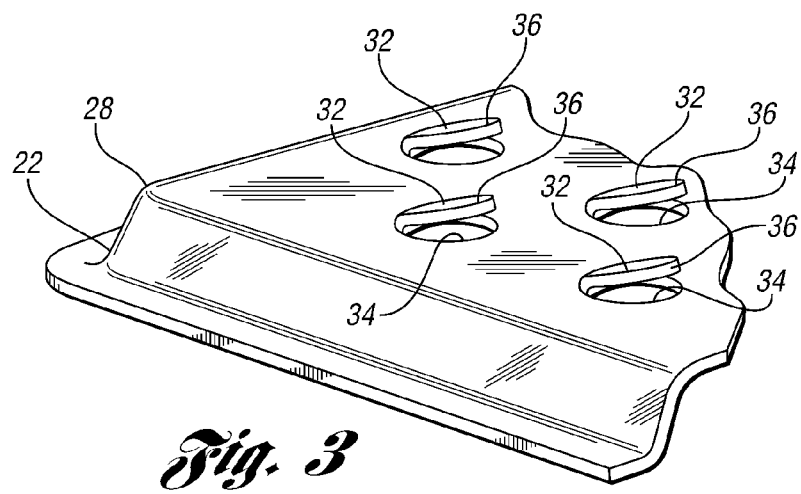
FIG. 3 is a fragmentary perspective view of the anode shown in FIG. 2.
Figure 4:
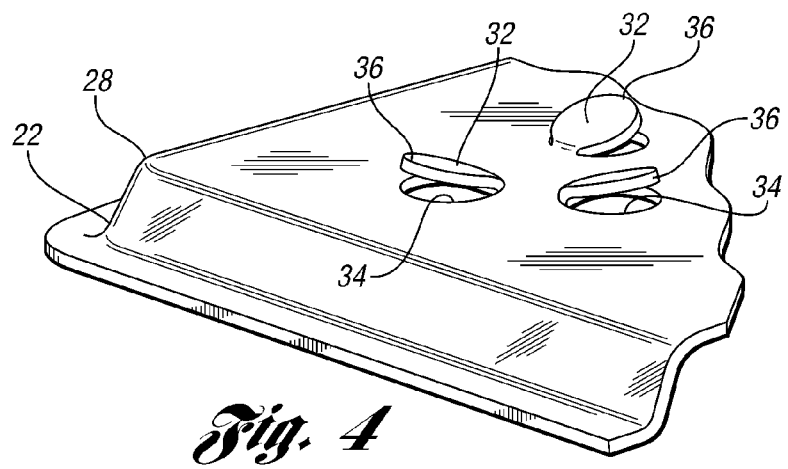
FIG. 4 is a fragmentary perspective view of another configuration of the anode shown in FIG. 2.

Referring to FIGS. 1 and 2, the anode 22 of the first cell 11a has a base plate 28 having a generally planar portion 30 and a plurality of partially cutout portions 32 partially cut out from the generally planar portion 30 to define a plurality of openings 34 in the base plate 28. Each cutout portion 32 is attached to the generally planar portion 30 and has a projecting part 36 that extends away the generally planar portion 30. Some or all of the projecting parts 36 may extend generally in the same direction, as shown in FIGS. 2 and 3, such as in an electrolyte flow direction 37 or opposite the electrolyte flow direction. As another example, some or all of the projecting parts 36 may extend in different directions, as shown in FIG. 4. Furthermore, the projecting parts 36 may be randomly oriented, arranged in rows or staggered across the generally planar portion 30. In any case, the cutout portions 32 and the openings 34 may be configured to allow electrolyte to flow on first and second sides of the generally planar portion 30 of the base plate 28 to thereby facilitate mixing of the electrolyte.

Furthermore, each cutout portion 32 and corresponding opening 34 may have any suitable configuration. For example, each cutout portion 32 and opening 34 may have a generally circular, oval or rectangular shape, and each cutout portion 32 may be generally planar, bent or corrugated. One or more of the cutout portions 32 may also contact a corresponding separator 14 to support the separator 14, or be spaced away from the separator 14, as shown in FIG. 1.

In addition, in the embodiment shown in FIGS. 1 and 2, a barrier layer 38, such as an impermeable membrane or plate, is attached to the base plate 28 such that barrier layer 38 and the anode 22 form an electrode assembly 40. The barrier layer 38 is spaced away from the generally planar portion 30 to define an additional flow chamber 42 for receiving electrolyte. Furthermore, some or all of the cutout portions 32 may extend between the base plate 28 and barrier layer 38 and into the additional flow chamber 42.

Figure 5:
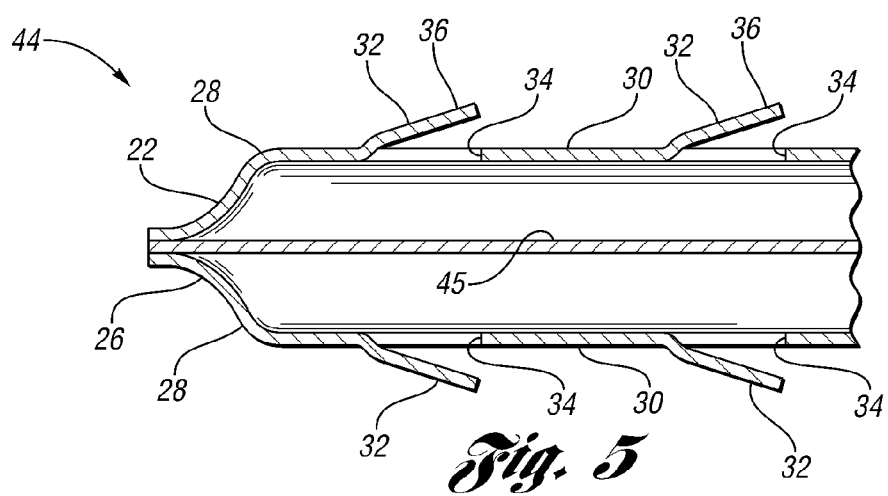
FIG. 5 is an enlarged fragmentary cross-sectional view of the cathode of the first cell and the anode of the second cell shown in FIG. 1, wherein the cathode and the anode are provided as a bipolar electrode assembly.

Referring to FIGS. 1 and 5, the cathode 26 of the first flow cell 11a and the anode 22 of the second flow cell 11b are combined together to form a bipolar electrode assembly 44. The anode 22 and the cathode 26 of the bipolar electrode assembly 44 each have a base plate 28 having a generally planar portion 30 and a plurality of partially cutout portions 32 partially cut out from the generally planar portion 30 to define a plurality of openings 34 in the base plate 28, such as described above with respect to the anode 22 of the first flow cell 11a. The base plates 28 are also connected together with a barrier layer 45, such as an impermeable membrane or plate, extending therebetween. With such a configuration, electrolyte from the first electrolyte supply arrangement 12 may flow on both sides of the generally planar portion 30 of the base plate 28 of the anode 22 of the second flow cell 11b, and electrolyte from the second electrolyte supply arrangement 13 may flow on both sides of the generally planar portion 30 of the base plate 28 of the cathode 26 of the first flow cell 11a.

The cathode 26 of the second flow cell 11b may have generally the same configuration as the anode 22 of the first flow cell 11a, except that the cathode 26 may comprise different materials, as explained below in detail. Furthermore, the cathode 26 of the second flow cell 11b may also be attached to a suitable barrier layer to form an electrode assembly.

In the multiple cell configuration shown in FIG. 1, all of the associated anodes 22 may communicate electrically and/or ionically, and all of the associated cathodes 26 may also communicate electrically and/or ionically. Furthermore, the endmost electrodes may function as current collectors. In that regard, with the orientation shown in FIG. 1, the leftmost anode 22 may function to collect current from the other anode 22 (or anodes 22 if the system 10 is provided with more than two cells), and the rightmost cathode 26 may function to collect current from the other cathode 26 (or cathodes 26 if the system 10 is provided with more than two cells). The leftmost anode 22 and the rightmost cathode 26 may also be electrically connected together to form a circuit.

Figure 6:
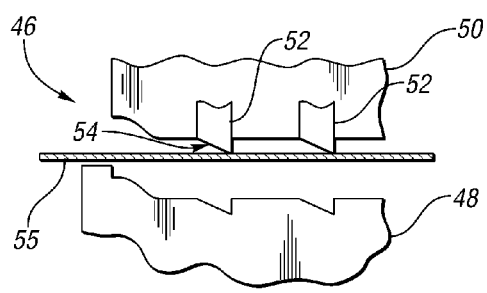
FIG. 6 is a fragmentary side cross-sectional view of a press for making the electrodes shown in FIG. 1.

The anodes 22 and the cathodes 26 may each be made of any suitable material and in any suitable manner. For example, the base plate 28 of each anode 22 and each cathode 26 may be punched, stamped or otherwise cut from a suitable sheet material, such as a steel plate or a plate made of another suitable metal or any other suitable material. Referring to FIG. 6, for example, a press 46 including a first press member, such as a die member 48, and a corresponding second press member, such as a punch member 50 having multiple punch heads 52 with angled surfaces 54, may be used to stamp each base plate 28 from sheet stock material 55, and also partially punch or otherwise partially cut each cutout portion 32 from each respective base plate 28. The press 46 may also be configured such that the angle of each punch head 52 may be adjusted to thereby form the cutout portions 32 such that the corresponding projecting parts 36 extend at different angles with respect to the corresponding generally planar portion 30 of the respective base plate 28. In addition, the punch heads 52 may be rotatable such that the cutout portions 32 and corresponding projecting parts 36 may extend at different rotational angles with respect to each other. Furthermore, if it is desired to provide a particular electrode with cutout portions 32 that extend on both sides of the corresponding base plate 28, then the press 46 may be configured with first and second press members that each have one or more punch heads. The press 46 may also be configured to form a peripheral flange around the perimeter of each base plate 28 for attachment with a respective barrier layer 38, 45 and/or additional base plate 28 of another electrode. Each base plate 28 may then be plated or otherwise coated with a suitable material. For example, for each anode 22, the corresponding base plate 28 may be coated with a lead, tin, zinc, or cadmium coating, or other suitable coating. For each cathode 26, the corresponding base plate 28 may be coated with a nickel coating, or other suitable coating.

Returning to FIG. 1, the electrolyte supply arrangements 12 and 13 are configured to supply electrolytes to the chambers 20 and 24 of the cells 11a and 11b, and the electrolytes function to ionically connect the electrodes 22, 26 of each cell 11a and 11b. The first electrolyte supply arrangement 12 includes a first electrolyte reservoir, such as a anolyte tank 56, in fluid communication with the anode chambers 20 for storing an anolyte, such as an aqueous solution or slurry containing zinc particles, zinc oxide, iron salt, cerium salt, halide, or vanadium oxide; water and alkali metal hydroxide or sulfuric acid; or a non-aqueous solution containing ethylammonium nitrate, imidazolium, sodium hexafluorophosphate, lithium hexafluorophosphate, lithium tetrafluoroborate and/or haloaluminate material or materials. Likewise, the second electrolyte supply arrangement 13 includes a second electrolyte reservoir, such as a catholyte tank 58, in fluid communication with the cathode chambers 24 and configured to store a catholyte, such as an aqueous solution containing an electrochemically reducible iron salt, cerium salt, halide, or vanadium oxide; water and alkali metal hydroxide or sulfuric acid; or a non-aqueous solution containing ethylammonium nitrate, imidazolium, sodium hexafluorophosphate, lithium hexafluorophosphate, lithium tetrafluoroborate and/or haloaluminate material or materials. The anolyte tank 56 may be connected to the housing 16 of the cells 11a and 11b via anolyte supply lines 60 and anolyte return lines 62, and the catholyte tank 58 may be connected to the housing 16 via catholyte supply lines 64 and catholyte return lines 66. Furthermore, the lines 60, 62, 64 and 66, or portions thereof, may be flexible and/or extendable to accommodate opening and closing of the cells 11a and 11b.

The first electrolyte supply arrangement 12 may further include an anolyte circulation pump 68 for moving anolyte between the anolyte tank 56 and the anode chambers 20, a first heat exchanger 70 for controlling temperature of the anolyte, and suitable valves for controlling flow of the anolyte. Likewise, the second electrolyte supply arrangement 13 may include a catholyte circulation pump 72 for moving catholyte between the catholyte tank 58 and the cathode chambers 24, a second heat exchanger 74 for controlling temperature of the catholyte, and suitable valves for controlling flow of the catholyte.

Referring to FIGS. 1-5, operation of the system 10 will now be described in more detail. When the cells 11a and 11b are in a closed position shown in FIG. 1, the system 10 may function in a charge mode or a discharge mode. In the charge mode, the system 10 accepts electrical energy from a source and stores the energy through chemical reactions. In the discharge mode, the system 10 may convert chemical energy to electrical energy, which may be released to a load in order to do work. In either mode, each separator 14 may facilitate chemical reactions, such as oxidation and reduction reactions at the electrodes 22, 26, by allowing ions to pass therethrough from one chamber 20, 24 of a respective cell 11a, 11b to the other chamber 20, 24 of the respective cell 11a, 11b.

The electrode configurations described above may provide numerous benefits during operation of the system 10. First, each electrode 22, 26 may facilitate or enhance mixing of the respective electrolyte received in the respective chamber 20, 24, such that generally uniform electrolyte component concentrations (e.g., ion concentrations) may be provided across the respective electrode 22, 26 from the respective inlet or inlets 17 to the respective outlet or outlets 18 of the respective cell 11a, 11b. For example, the cut out portions 32 and corresponding openings 34 may promote turbulent flow of electrolyte. As a more detailed example, each cutout portion 32 may function as a ramp that facilitates mixing of electrolyte to thereby reduce flow boundary layers.

Second, the cut out portions 32 and corresponding openings 34 may enable flow of electrolyte on both sides of a respective base plate 28. For example, each cutout portion 32 may direct flow of electrolyte through a particular opening 34 such that electrolyte flows from one side of the corresponding base plate 28 to another side of the base plate 28. As a result, electrode surface area made available during operation of the system 10 may be significantly increased. For example, regarding the anode side of each cell 11a, 11b, because electrolyte is able to flow on both sides of the base plate 28 of the anode 22, both sides of the base plate are available for material deposition, such as zinc deposition.

By enabling flow on both sides of each electrode 22, 26, concentration gradients of electrolyte components (e.g., ions) may further be made more uniform from the inlet or inlets 17 to the outlet or outlets 18 of each respective cell 11a, 11b. For example, ion rich electrolyte entering a cell inlet or inlets 17 on a first side of a corresponding electrode 22, 26 may be directed or otherwise allowed to flow to an opposite second side of the corresponding electrode 22, 26 proximate the inlet or inlets 17 via the corresponding cutout portions 32 and openings 34. That relatively ion rich electrolyte may then be redirected or otherwise allowed to flow to the first side of the corresponding electrode 22, 26 proximate central portions of the corresponding electrode 22, 26 as well as proximate the outlet or outlets 18, such that the relatively ion rich electrolyte may mix with relatively ion deprived electrolyte to thereby facilitate more uniform ion concentrations across the corresponding electrode 22, 26 from the inlet or inlets 17 to the outlet or outlets 18.

Figure 7:
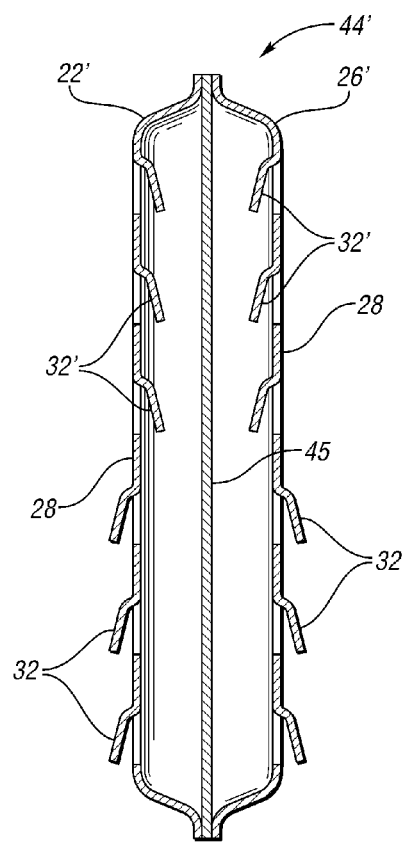
FIG. 7 is an enlarged cross-sectional view of another embodiment of an electrode assembly according to the present disclosure.
Figure 8:
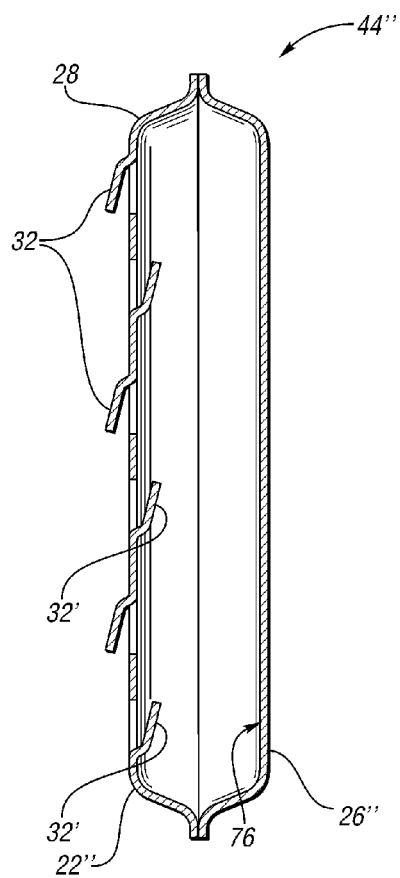
FIG. 8 is an enlarged cross-sectional view of yet another embodiment of an electrode assembly according to the present disclosure.

Additional embodiments 44' and 44" of a bipolar electrode assembly for use with the cells 11a and 11b are shown in FIGS. 7 and 8. The electrode assembly 44' shown in FIG. 7 includes similar features as the electrode assembly 44, and those features are identified with the same or similar reference numbers. In that regard, the electrode assembly 44' includes an anode 22' connected to a cathode 26' with a barrier layer 45 therebetween. Both the anode 22' and the cathode 26', however, include cutout portions 32 and 32' that extend on both sides of a corresponding base plate 28. With such a configuration, the cutout portions 32 may direct or otherwise influence electrolyte flow from a first side to a second side of the corresponding base plate 28, and the cutout portions 32' may direct or otherwise influence electrolyte flow from the second side to the first side of the base plate 28. Furthermore, the cutout portions 32 and 32' may function to enhance mixing of electrolyte on both sides of the base plate 28.

Although the cutout portions 32 are shown on a lower portion of the electrode assembly 44' and the cutout portions 32' are shown on an upper portion of the electrode assembly 44', the cutout portions 32 and 32' may be arranged in any suitable manner. For example, the anode 22' and the cathode 26' may each be provided with cutout portions 32 that alternate with cutout portions 32' from side to side and/or from a top end to a lower end of the electrode assembly 44'.

The electrode assembly 44" shown in FIG. 8 includes first and second electrodes, such as an anode 22" and a cathode 26", respectively, attached together without an intermediate barrier layer. The anode 22" includes cutout portions 32 and 32' that extend on both sides of base plate 28, and the cutout portions 32 alternate with the cutout portions 32'. The cathode 26", however, is not provided with any cutout portions. As result, an inner surface 76 of the cathode 26" may be used as part of the anode 22". For example, the inner surface 76 may be used as an additional deposition surface for material, such as zinc, during a charging operation, for example. In such a case, the inner surface 76 of the base plate of the cathode 26" may be electroplated or otherwise coated with a suitable coating, such as tin or cadmium. Otherwise, if the inner surface 76 is not intended for use as a deposition surface, then the inner surface 76 may be coated with a suitable impervious coating, for example.

Figure 9:
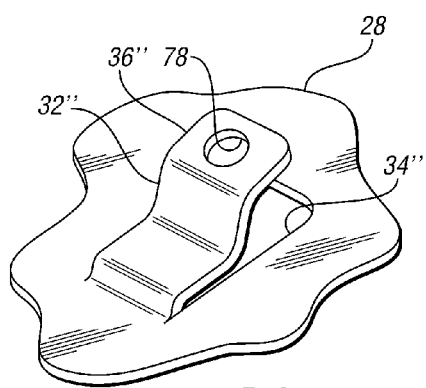
FIG. 9 is an enlarged fragmentary perspective view of another embodiment of a cutout portion for use with an electrode according to the present disclosure.

Referring to FIG. 9, an additional embodiment 32" of a cutout portion is shown. The cutout portion 32", which may be provided with any of the above-described embodiments, includes a corrugated projecting part 36" having an aperture 78. Such a corrugated configuration may further enhance mixing of electrolyte. In addition, the aperture 78 may allow electrolyte to flow through the projecting part 36", which may be beneficial if, for example, the projecting part 36" contacts a corresponding separator 14.

Other embodiments according to the present disclosure may be formed by combining one or more features disclosed above with respect to one embodiment with one or more features of another embodiment. For example, the anode 22 of the first cell 11a and the cathode 26 of the second cell 11b shown in FIG. 1 may each be provided with cutout portions that extend on both sides of the corresponding base plate 28, such as shown with respect to the electrode assemblies 44' and 44".

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An energy storage system comprising:
   a cell having a flow chamber for receiving electrolyte; and
   an electrode positioned in the cell, the electrode including a base plate having a generally planar portion and a plurality of partially cutout portions partially cut out from the generally planar portion to define a plurality of openings in the base plate, each cutout portion being attached to the generally planar portion and having a projecting part that extends away from the generally planar portion, wherein the openings and the cutout portions are configured to enhance mixing of the electrolyte when the electrolyte is received in the flow chamber.

2. The energy storage system of claim 1 wherein the projecting parts of the electrode extend in different directions.

3. The energy storage system of claim 1 wherein the projecting parts of the electrode extend generally in the same direction.

4. The energy storage system of claim 1 wherein each cutout portion defines a ramp.

5. The energy storage system of claim 1 further comprising an ion-permeable separator arranged in the cell, wherein the cutout portions are engaged with the separator for supporting the separator.

6. The energy storage system of claim 1 wherein at least one of the cutout portions is corrugated.

7. The energy storage system of claim 1 wherein each projecting part is bent away from the generally planar portion of the base plate.

8. The energy storage system of claim 1 further comprising a barrier layer attached to the electrode such that the barrier layer is spaced away from the generally planar portion of the base plate, the barrier layer and the generally planar portion of the base plate defining an additional flow chamber for receiving the electrolyte such that the electrolyte may flow on first and second sides of the generally planar portion of the base plate, wherein the base plate is positioned between the flow chamber and the additional flow chamber.

9. The energy storage system of claim 8 wherein the projecting part of one of the cutout portions extends into the flow chamber, and the projecting part of another one of the cutout portions extends into the additional flow chamber.

10. The energy storage system of claim 1 further comprising an additional electrode attached to the electrode such that the additional electrode is spaced away from the generally planar portion of the base plate, and a barrier layer disposed between the electrode and the additional electrode, wherein the barrier layer and the generally planar portion of the base plate define an additional flow chamber for receiving the electrolyte such that the electrolyte may flow on first and second sides of the generally planar portion of the base plate.

11. The energy storage system of claim 10 wherein the cutout portions include multiple first cutout portions and multiple second cutout portions, and the projecting part of each first cutout portion extends into the flow chamber, and the projecting part of each second cutout portion extends into the additional flow chamber.

12. The energy storage system of claim 1 wherein at least one of the cutout portions has an aperture for allowing the electrolyte to flow through the at least one cutout portion.

13. An energy storage system comprising:
   a cell having a flow chamber for receiving electrolyte, an inlet for introducing the electrolyte into the flow chamber and an outlet for allowing the electrolyte to exit the flow chamber; and
   an electrode assembly positioned in the cell, the electrode assembly including a base plate having a generally planar portion and a plurality of partially cutout portions partially cut out from the generally planar portion to define a plurality of openings in the base plate, the electrode assembly further including a barrier layer attached to the base plate such that barrier layer is spaced away from the generally planar portion to define an additional flow chamber for receiving the electrolyte, wherein the openings vary in size between the inlet and the outlet of the cell, each cutout portion is attached to the generally planar portion and has a projecting part that extends away from the generally planar portion, and the openings and the cutout portions are configured to allow the electrolyte to flow on first and second sides of the generally planar portion of the base plate.

14. An electrode for use with an energy storage system having a cell including a flow chamber configured to receive an electrolyte, the electrode comprising:
   a base plate having a generally planar portion and a plurality of partially cutout portions partially cut out from the generally planar portion to define a plurality of openings in the base plate, each cutout portion being attached to the generally planar portion and having a projecting part that extends away from the generally planar portion, wherein the openings and the cutout portions are configured to enhance mixing of electrolyte that flows through the flow chamber of the cell.

15. The electrode of claim 14 further comprising an electroplated layer applied over the base plate.

16. The electrode of claim 14 wherein the projecting parts extend in different directions.

17. The electrode of claim 14 wherein the projecting parts extend generally in the same direction.

18. The electrode of claim 14 wherein each cutout portion defines a ramp.

19. The electrode of claim 14 wherein at least one of the cutout portions is corrugated.

20. The electrode of claim 14 wherein the generally planar portion has first and second sides, and wherein the cut out portions include multiple first cut out portions that protrude from the first side and multiple second cut out portions that protrude from the second side.

* * * * *